(12) United States Patent
Lahr et al.

(10) Patent No.: US 11,451,713 B2
(45) Date of Patent: Sep. 20, 2022

(54) AUTOGAINING OF COLOR PATTERN FILTERED SENSORS TO ENSURE COLOR FIDELITY

(71) Applicant: Rockwell Collins, Inc., Cedar Rapids, IA (US)

(72) Inventors: Weston J. Lahr, Sherwood, OR (US); Julian C. Ryde, East Hampton, CT (US); Richard M. Rademaker, Cedar Rapids, IA (US); Richard Jinkins, Rewey, WI (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/320,465

(22) Filed: May 14, 2021

(65) Prior Publication Data
US 2021/0360135 A1 Nov. 18, 2021

Related U.S. Application Data

(60) Provisional application No. 63/025,777, filed on May 15, 2020.

(51) Int. Cl.
*H04N 5/235* (2006.01)
*H04N 1/60* (2006.01)
*H04N 9/64* (2006.01)
*H04N 9/73* (2006.01)

(52) U.S. Cl.
CPC .......... *H04N 5/2351* (2013.01); *H04N 9/735* (2013.01)

(58) Field of Classification Search
CPC ......... H04N 5/235–2353; H04N 5/243; H04N 1/60–6008; H04N 1/6027; H04N 1/6041; H04N 9/64

USPC ...................................................... 348/221.1
See application file for complete search history.

(56) References Cited

U.S. PATENT DOCUMENTS

| | | | |
|---|---|---|---|
| 7,889,245 B2 | 2/2011 | Lukac | |
| 8,508,612 B2 | 8/2013 | Côté et al. | |
| 9,013,594 B1 | 4/2015 | Li | |
| 9,014,504 B2 | 4/2015 | Lim et al. | |
| 9,374,568 B2 | 6/2016 | Maruyama et al. | |
| 9,741,099 B2 | 8/2017 | Lim et al. | |
| 10,229,484 B2 | 3/2019 | Roffet et al. | |
| 2005/0275737 A1* | 12/2005 | Cheng .................. | H04N 5/2351 348/333.02 |
| 2007/0182845 A1 | 8/2007 | Hunter | |

(Continued)

FOREIGN PATENT DOCUMENTS

| | | |
|---|---|---|
| EP | 2760207 A1 | 7/2014 |
| JP | 2011150281 A * | 8/2011 |

OTHER PUBLICATIONS

Extended Search Report for European Application No. 21174171.5 dated Sep. 15, 2021, 8 pages.

*Primary Examiner* — Anthony J Daniels
(74) *Attorney, Agent, or Firm* — Suiter Swantz pc llo

(57) ABSTRACT

A system and method are provided for automatically adjusting exposure to maintain color fidelity where a point source puts a small cluster of pixels in saturation. An exposure level is iteratively reduced until pixels corresponding only one color in a Bayer filter remain above a threshold while all other colors are at or below the threshold. The cluster of pixels is isolated for analysis such that only neighboring pixels are considered while reducing the exposure.

15 Claims, 6 Drawing Sheets

(56) References Cited

U.S. PATENT DOCUMENTS

2014/0333823 A1 11/2014 Sakaguchi
2019/0260978 A1 8/2019 Guérin et al.

* cited by examiner

AUTOGAINING OF COLOR PATTERN FILTERED SENSORS TO ENSURE COLOR FIDELITY

PRIORITY

The present application claims the benefit under 35 U.S.C. § 119(e) of U.S. Provisional App. No. 63/025,777 (filed May 15, 2020), which is incorporated herein by reference.

BACKGROUND

Focal plane photosensor arrays (the sensor component of a camera) have limited instantaneous dynamic range. As a result, an algorithm is necessary to automatically control the gain or integration time of the camera to ensure the image is within the usable range and not all black or all white.

Various automatic exposure control algorithms may be employed depending on the expected type of image and the image information regarded as most important for preservation. Such algorithms generally allow a small percentage of saturated pixels to balance to majority of the image; for example, 10 out of 12 million pixels is a small, acceptable percentage).

When sensing a light at a distance, it occupies very few pixels. If the light is substantially brighter than the rest of the image, automatic exposure control may cause those few pixels to become saturated and color information would be lost. Conversely, exposure control designed to not allow any saturation may result in a dark scene when high-contrast objects such as lights are present.

SUMMARY

In one aspect, embodiments of the inventive concepts disclosed herein are directed to a system and method for automatically adjusting exposure to maintain color fidelity where a point source puts a small cluster of pixels in saturation. An exposure level is iteratively reduced until pixels corresponding to one color in a Bayer filter fall below a threshold while another color remains in saturation.

In a further aspect, the cluster of pixels is isolated for analysis such that only neighboring pixels are considered while reducing the exposure.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
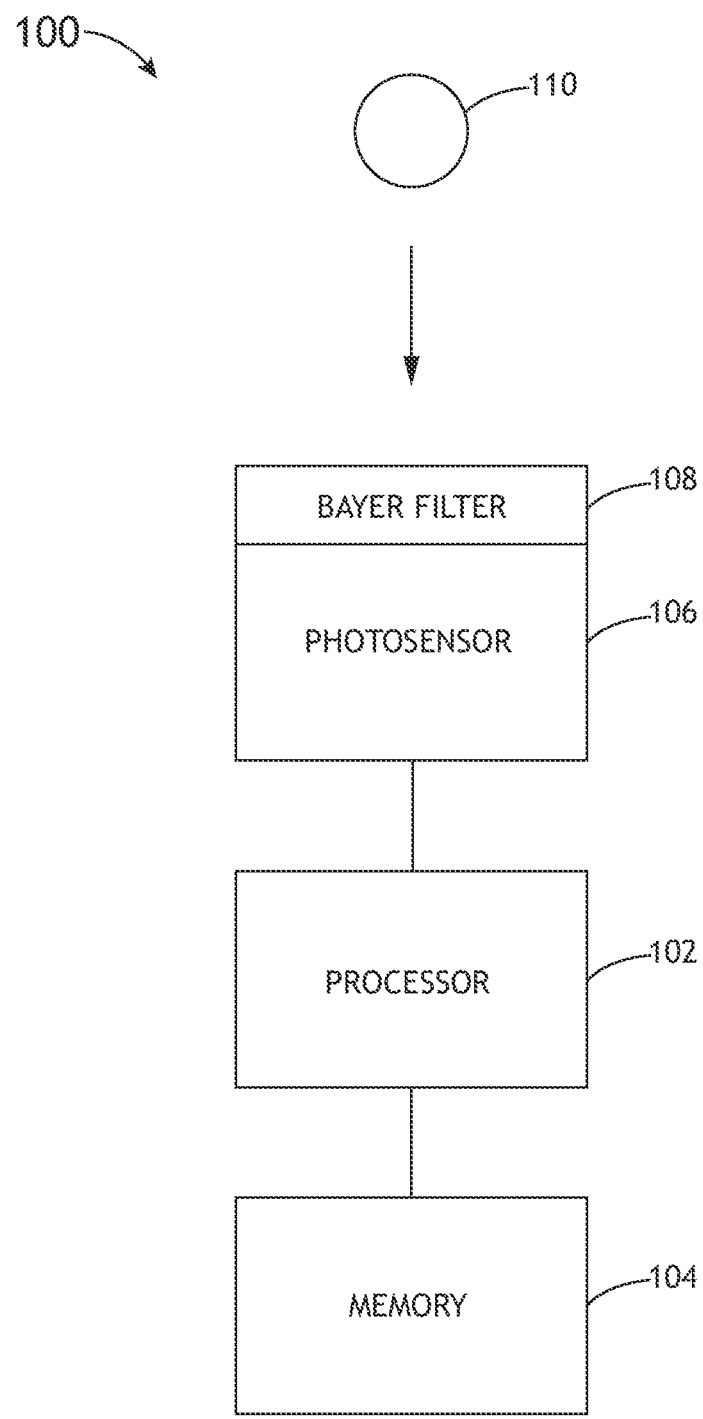
FIG. 1 shows a block diagram of a system useful to implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for automatically adjusting exposure to maintain color fidelity where a point source puts a small cluster of pixels in saturation. An exposure level is iteratively reduced until pixels corresponding to one color in a Bayer or similar color filter fall below a threshold while another color remains in saturation. As used herein, exposure should be understood to generally refer to integration time and/or gain.

Referring to FIG. 1, a block diagram of a system 100 useful to implementing an exemplary embodiment is shown. The system 100 includes a processor 102 and memory 104 embodying processor executable code to configured the processor 102 to receive signals from a photosensor array 106 with a Bayer filter 108. The processor 102 performs automatic exposure control on images from the photosensor array 106.

Where the image includes a small or distance light source 110, the light source 110 may occupy a small cluster of pixels on the photosensor array 106. If the light source 110 is significantly brighter than surrounding portions of the image, the automatic exposure control may cause the cluster of pixels to be pushed into saturation such that color fidelity of the cluster is lost.

The processor 102 reduces the exposure of the image until pixels of only a single color in the cluster are above a predefined threshold. Based on the reduced exposure, the color of the cluster may be determined.

It may be appreciated that while specific embodiments described herein may refer to one or more general purpose processors 102, embodiments are envisioned utilizing dedicated hardware loops or gate arrays. It may be appreciated that exposure adjustment may be either local or global depending on the hardware capabilities.

Figure 2:
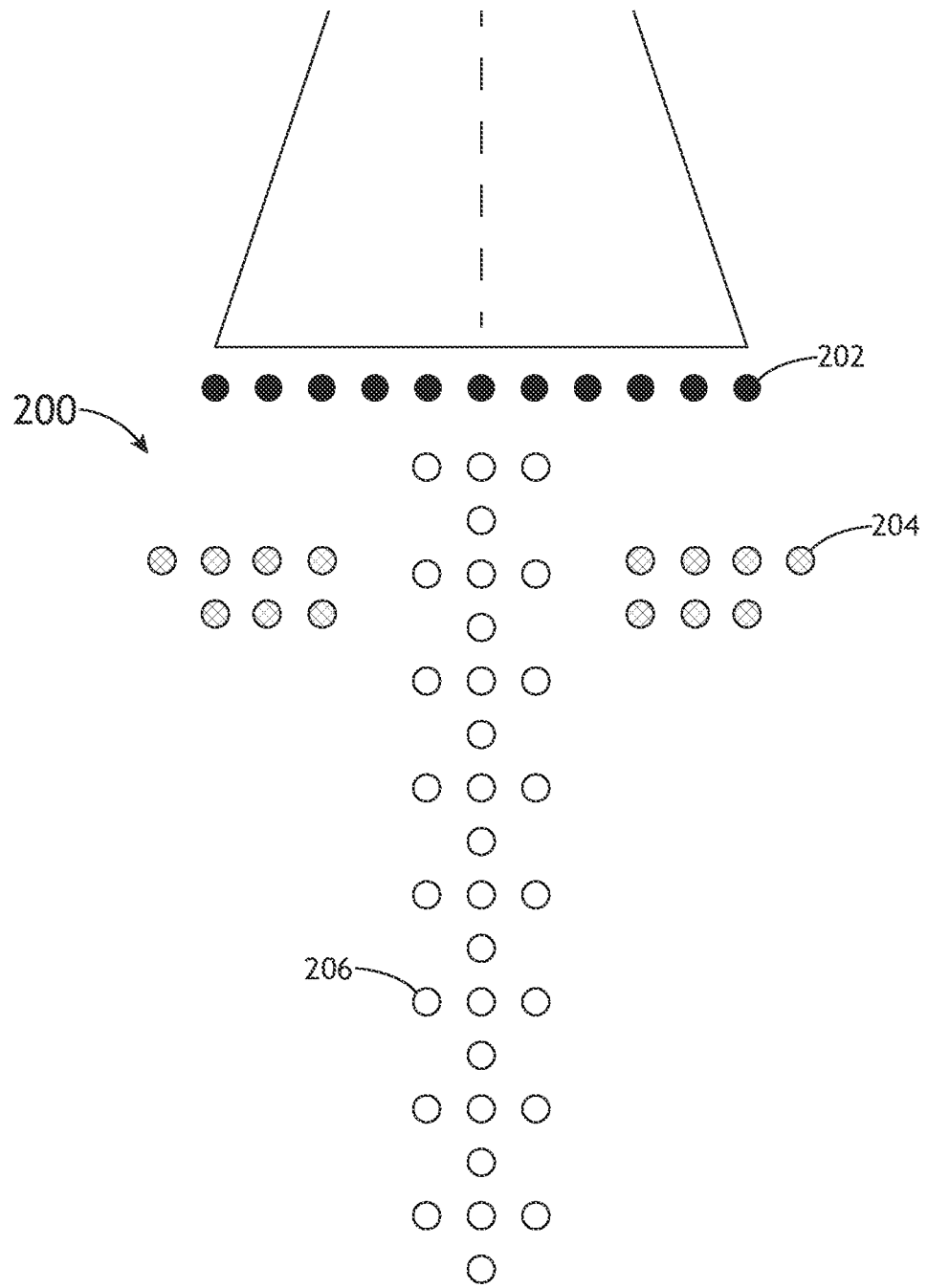
FIG. 2 shows landing light configurations where exemplary embodiments may be useful.

Referring to FIG. 2, landing light configurations where exemplary embodiments may be useful are shown. In specific embodiments, when applying machine vision techniques to images of approach lighting systems 200, it is important to be able to both accurately determine the location in the image of the light 202, 204, 206 as well as the color of the light 202, 204, 206. Color is important to assist in understanding the correspondence between the light 202, 204, 206 sensed in the image and the light 202, 204, 206 associated with the runway that it corresponds to. For example, identifying a set of green lights 202 allows a processor to quickly narrow down what lights are being identified. Such embodiments may be particularly useful in neural network, machine learning applications where properly identifying color may be a critical decision component.

Figure 3A:
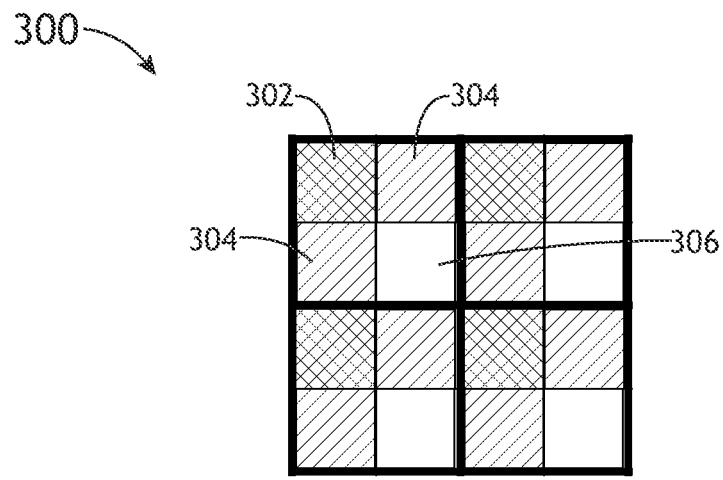
FIG. 3A shows a block representation of a cluster of pixels in a photosensor array and Bayer filter.
Figure 3B:
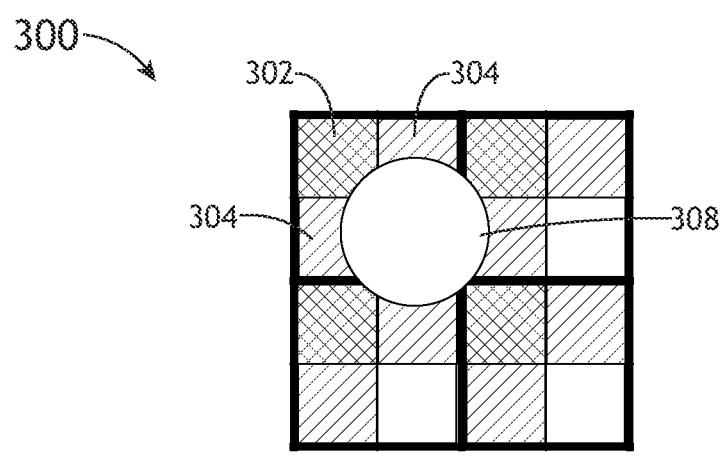
FIG. 3B shows a block representation of a cluster of pixels in a photosensor array and Bayer filter including an illuminated portion.

Referring to FIGS. 3A-3B, block representations of a cluster of pixels 302, 304, 306 in a photosensor array 300 and Bayer filter are shown. Color cameras generally use a Bayer filter over pixels 302, 304, 306 that are sensitive to all visible light. Each pixel 302, 304, 306 thereby becomes sensitive only to a particular color; for example, one or more red pixels 302, one or more green pixels 304, and one or more blue pixels 306.

In at least one embodiment, when converting signals from the photosensor array 300 to a usable image, the local neighborhood of pixels 302, 304, 306 may be used to interpolate missing color elements for each pixel 302, 304, 306. For example, for a green pixel 304, the neighboring red pixels 302 are interpolated to create an estimated red value and the neighboring blue pixels 306 are interpolated to create an estimated blue value. In such a system, only a single color value is actually known at a given location, the other colors are estimated assuming the neighbors are representative of that pixel 302, 304, 306.

Where a small (or distance) source 308 corresponds to only a small number of pixels 302, 304, 306, there may not be enough neighboring pixels 302, 304, 306 for a good estimation. Furthermore, where the intensity of the source 308 is substantially greater than other local parts of the image (or the image globally), the affected pixels 302, 304, 306 may be pushed to saturation, no matter their associated color, by an automatic exposure control process.

Figure 4A:
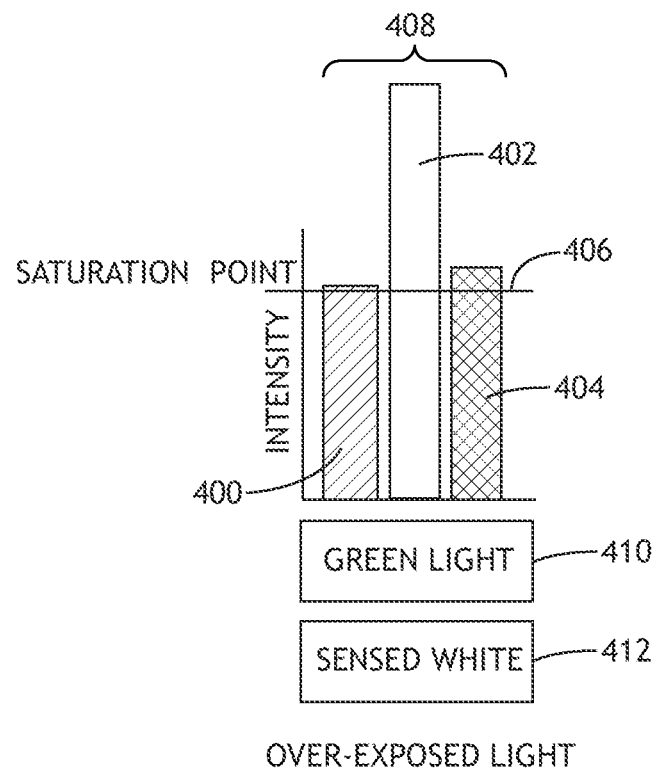
FIG. 4A shows a graph representing pixel signals in a Bayer filtered photosensor array.
Figure 4B:
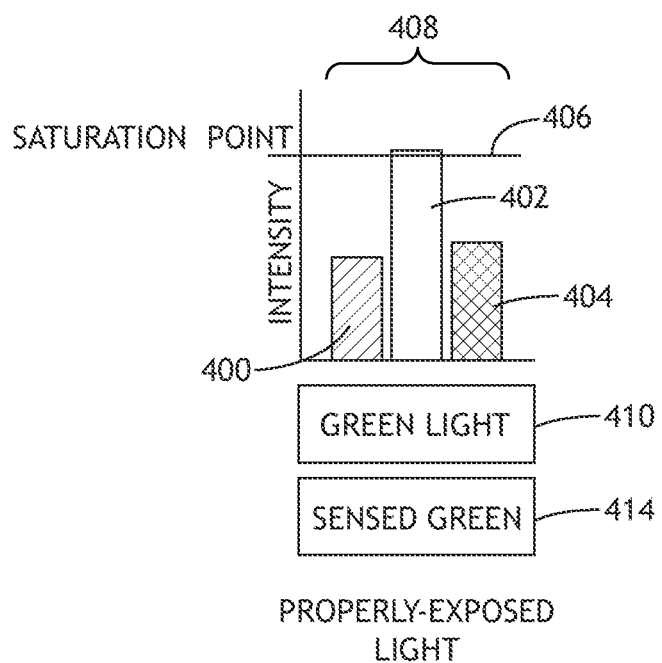
FIG. 4B shows a graph representing pixel signals in a Bayer filtered photosensor array.

Referring to FIG. 4A-4B, graphs representing pixel signals in a Bayer filtered photosensor array are shown. During an automatic exposure control process, signals 400, 402, 404 produced by actual color exposure 408 are balanced to enhance the corresponding image; such processes may cause distortions in the image such as compressing intensity by over exposing certain pixels (such as in FIG. 4A) beyond the saturation point 406 of the pixel such that any higher light intensity can no longer be registered. In such circumstances, while certain colors may be more intense than others in actuality, signals 400, 402, 404 generated by the corresponding pixels may be substantially similar if the automatic exposure control process determines that the exposure should be increased based on other portions of the image, and thereby pushes the pixels to or beyond the saturation point 406. In those cases, even though green filtered light is substantially more intense in reality, and the actual color 410 should register as a green light, a processor may determine that the signal indicates a sensed color 412 corresponding to white light.

By contrast, if the filtered colors where balanced to each other via automatic exposure control, the most intense filtered color (in this case green filtered light) may produce signals 400, 402, 404 that approach the saturation point 406, but a signal 400 corresponding to red filtered light and a signal 404 corresponding to blue filtered light would not. The actual sensed color 414 would thereby be preserved and generally correspond to the actual color 410.

It may be appreciated that, while specific embodiments describe a Bayer filter, the principles apply to other types of color filter arrays.

Figure 5:
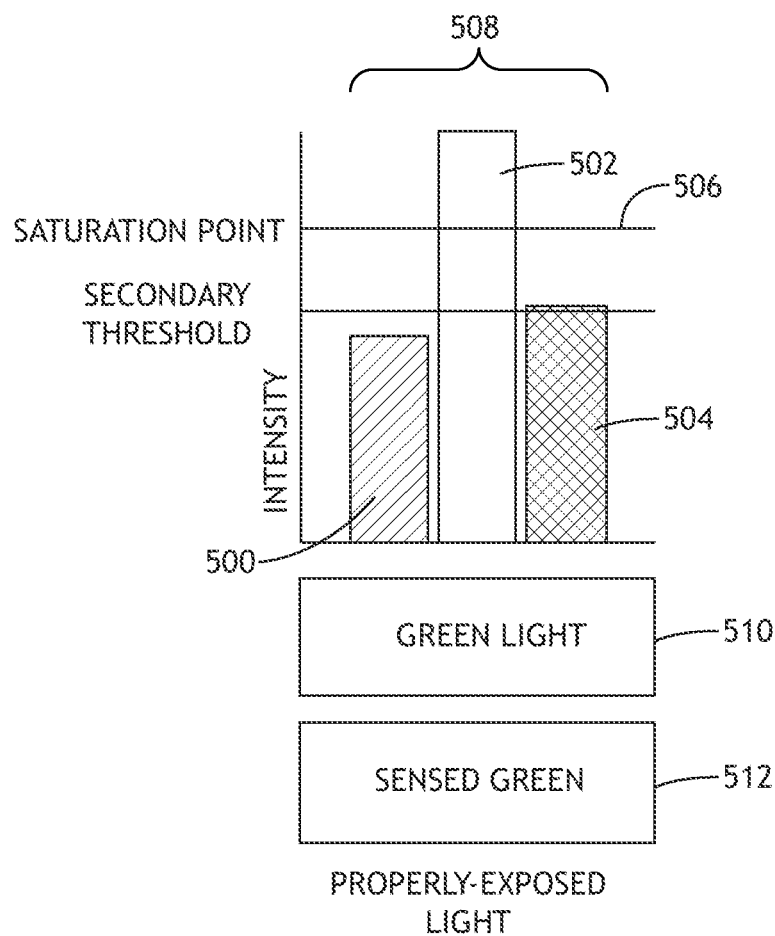
FIG. 5 shows a graph representing pixel signals in a Bayer filtered photosensor array according to an exemplary embodiment.

Referring to FIG. 5, a graph representing pixel signals in a Bayer filtered photosensor array according to an exemplary embodiment is shown. Where a processor executes an automatic exposure control process that pushes a cluster of pixels to or beyond the saturation point 506, the processor may then establish a secondary threshold 508 below the saturation point 506. The secondary threshold 508 may be defined by a pixel signal value or voltage that is clearly distinguishable from the saturation point 506.

Exposure is then reduced until all but one color-specific signal 500, 502, 504 is below the secondary threshold 508. For example, while a signal 500 corresponding to a red filtered light and a signal 504 corresponding to a blue filtered light are above the secondary threshold 508, the exposure is iteratively reduced. The process continues until only the signal 502 corresponding to green filtered light is above the secondary threshold 508. In the present example, the green filtered light signal 502 is also above the saturation point 506, through that is not necessarily true.

A processor may determine that the actual color 510 is some shade of green, though the actual intensity of the green light may only be known with a degree of accuracy, and produce a sensed color 512 according to adjusted signals 500, 502, 504. Alternatively, or in addition, the processor may monitor raw Bayer intensity values from each pixel and increase exposure until the second brightest local color channel (in this case, blue filtered light) is just below the secondary threshold 508. In at least one embodiment, the secondary threshold 508 may be 75% of the saturation point 506.

While the process may not perfectly preserve color balance, it allows for a determination of classification of the color (green vs white vs red). Such general classification may be useful for machine identification purposes. When an ideal exposure is reached, it may oscillate between under and over exposed or use a stabilization method such as a hysteresis.

Figure 6:
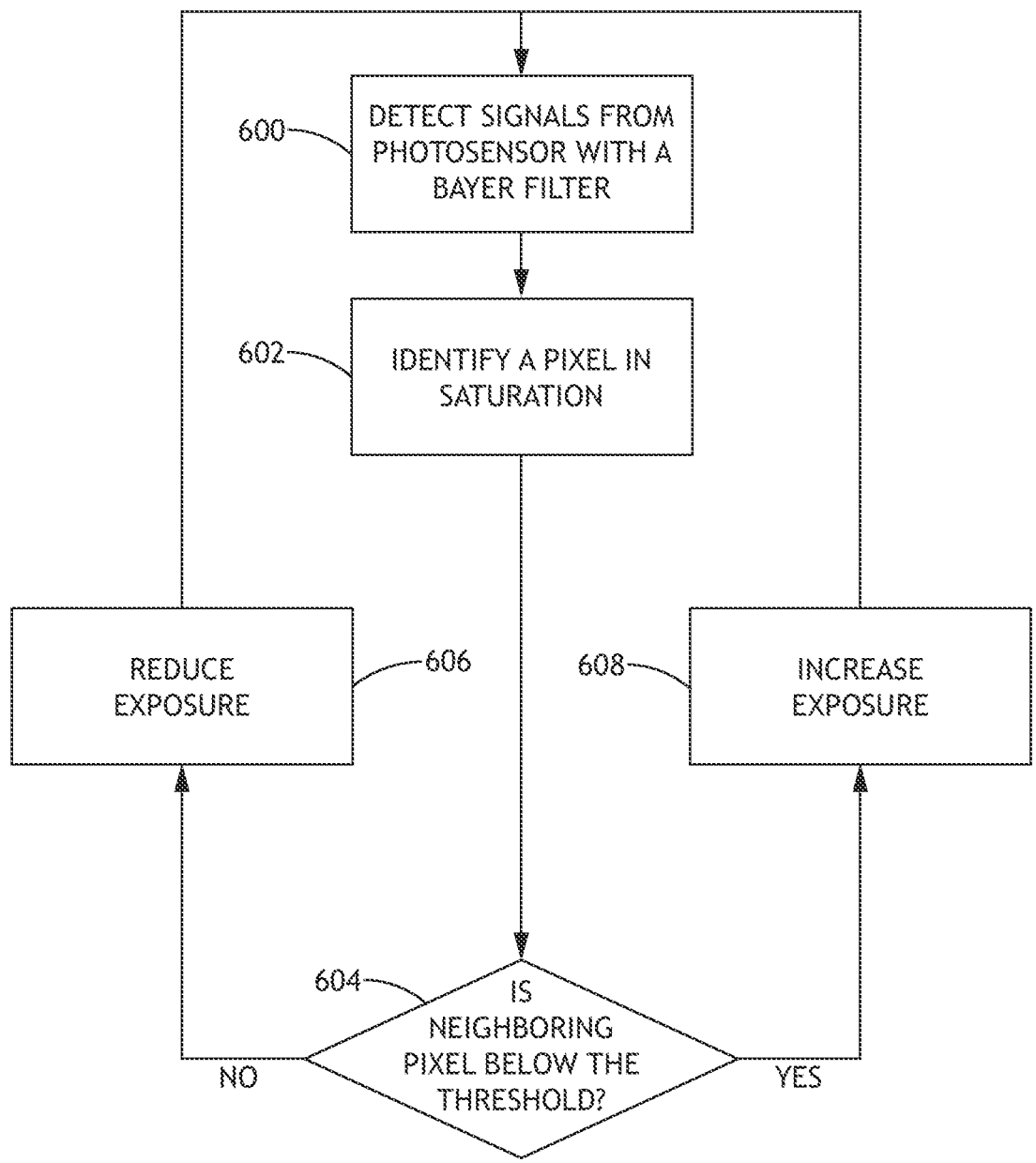
FIG. 6 shows a flowchart of a method for exposure adjustment according to an exemplary embodiment.

Referring to FIG. 6, a flowchart of a method for exposure adjustment according to an exemplary embodiment is shown. A processor detects 600 signals from a photosensor array. A Bayer filter (or other color filter array) characterizes each of the pixels in the photosensor array according to a color. The processor may perform an automatic exposure control process on the received signals that may overexpose one or more clusters of pixels based on point sources substantially brighter than the background or other portions of the image.

The processor may identify 602 a cluster of pixels in saturation. In at least one embodiment, where the processor is performing machine image recognition, identifying 602 pixels in saturation may comprise determining through image recognition that the image comprises landing lights, and that portions of the image depict small white light sources. Small white light sources in an image of landing lights may comprise other colors of light, but the corresponding pixels may be pushed to saturation via exposure control or other image altering processes.

In at least one embodiment, the identified pixels are isolated for analysis; if the processor determines 604 that the second brightest color is at or below a secondary threshold, the exposure is reduced 606. In at least one embodiment, the pixels associated with the small white light source are isolated into color channels such that green filtered pixels are considered as a set, red filtered pixels are considered as a set, and blue filtered pixels are considered as a set. Once the second brightest set is at or below the secondary threshold, the processor may increase 608 exposure such that the exposure of the image tends to oscillate between overexposed and underexposed. The processor may then determine a sensed color generally corresponding to the actual color of the light.

In at least one embodiment, the process may operate in a feedback loop until the second brightest channel is at or just below the secondary threshold. Furthermore, a feedback loop may operate over multiple, sequential images.

In at least one embodiment, multiple independent clusters of pixels may be identified 602. In that case, each independent cluster may be separately analyzed. Alternatively, or in addition, each cluster may be tagged and reanalyzed as individual clusters are processed to determine a new exposure.

It may be appreciated that while specific embodiments describe landing light identification, embodiments may be useful for any application where it is useful for an image processing system to maintain color fidelity when analyzing an image include small, bright point sources in a relatively less intense image; for example, identifying traffic lights.

While specific embodiments are described as operating on a Bayer pattern, it may be appreciated that the methods described are applicable after color interpolation is performed where neighboring values are used to create a RGB value per pixel. In such cases, the RGB value for a pixel may be used rather than neighboring pixels as the color interpolation process inherently includes analysis of neighboring pixels.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a photosensor array;
   a Bayer filter disposed on the photosensor array; and
   at least one processor in data communication with a memory storing processor executable code for configuring the at least one processor to:
      receive one or more signals from the photosensor array;
      identify a plurality of pixels in the photosensor array corresponding to a point source, the plurality of pixels comprising at least two color channels;
      identify at least one first pixel in the photosensor array in saturation, the at least one first pixel being in a first color channel; and
      adjust an exposure until all pixels in the plurality of pixels outside the first color channel fall below a predefined threshold.

2. The computer apparatus of claim 1, wherein the at least one processor is further configured to output an estimated color of the point source.

3. The computer apparatus of claim 1, wherein the at least one processor is further configured to identify pixels outside the first color channel based on a known color pattern of a color filter.

4. The computer apparatus of claim 3, wherein the color filter is a Bayer filter.

5. The computer apparatus of claim 1, wherein at least one processor is further configured to apply an autogain adjustment process.

6. The computer apparatus of claim 5, wherein identifying the plurality of pixels in the photosensor array corresponding to a point source comprises:
   identifying a cluster of pixels in saturation; and
   identifying that remaining pixels are balanced.

7. The computer apparatus of claim 1, wherein:
   the computer apparatus is embodied in an aircraft; and
   at least one processor is further configured to identify runway lights.

8. The computer apparatus of claim 1, wherein identifying the plurality of pixels in the photosensor array corresponding to a point source comprises identifying a cluster of saturated pixels indicating a color of light in an otherwise well-balanced image.

9. A method comprising:
   receiving one or more signals from a photosensor array;

identifying a plurality of pixels in the photosensor array corresponding to a point source, the plurality of pixels comprising at least two color channels;

identifying at least one first pixel in the photosensor array in saturation, the at least one first pixel being in a first color channel; and adjusting an exposure until all pixels in the plurality of pixels outside the first color channel fall below a predefined threshold.

10. The method of claim 9, further comprising outputting an estimated color of the point source.

11. The method of claim 9, further comprising identifying pixels outside the first color channel based on a known color pattern of a color filter.

12. The method of claim 9, further comprising applying an autoexposure adjustment process.

13. The method of claim 12, wherein identifying the plurality of pixels in the photosensor array corresponding to a point source comprises:

identifying a cluster of pixels in saturation; and
identifying that remaining pixels are balanced.

14. The method of claim 9, wherein identifying the plurality pixels in the photosensor array corresponding to a point source comprises identifying a cluster of saturated pixels indicating a color of light in an otherwise well-balanced image.

15. The method of claim 9, further comprising iteratively adjusting the exposure while analyzing each of a plurality of point sources.

\* \* \* \* \*